3,681,143
LITHIUM-METAL VANADATE ORGANIC
ELECTROLYTE CELL
Arabinda N. Dey, Needham, Mass., assignor to P. R.
Mallory & Co., Inc., Indianapolis, Ind.
Filed Sept. 3, 1970, Ser. No. 69,273
Int. Cl. H01m 23/02
U.S. Cl. 136—83 R                                          15 Claims

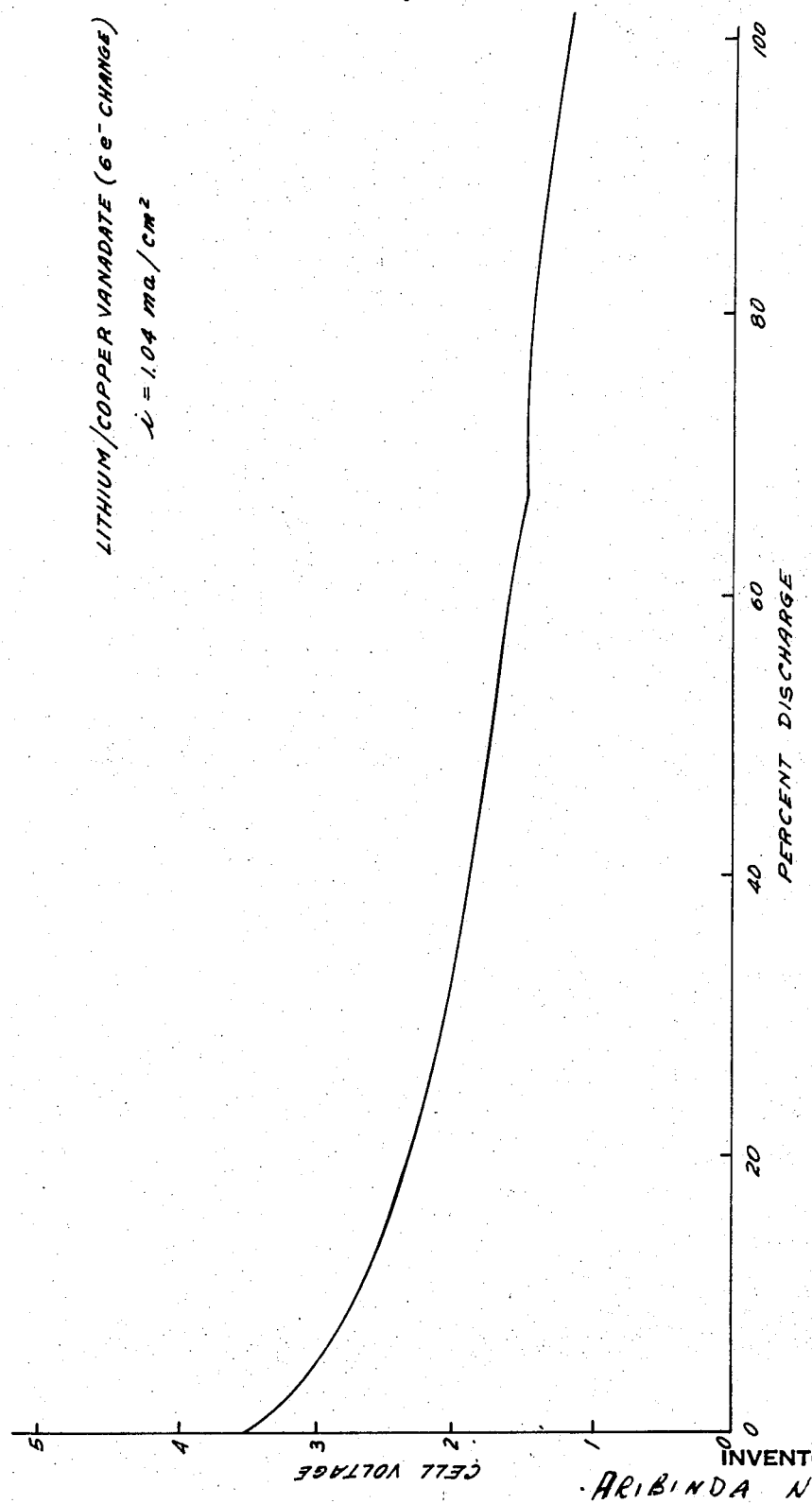

ABSTRACT OF THE DISCLOSURE

This invention relates to novel high energy density primary electric cells comprising positive electrodes composed of any of the vanadates of silver, copper, iron, cobalt, nickel, mercury, thallium, lead, bismuth and their mixtures, and negative electrodes composed of a metal selected from the group of light metals, said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxyethane, aceto-nitrile and the mixtures thereof, and having dissolved therein soluble salts of the light metals, for example, the perchlorates, hexafluorophosphates, tetrafluoroborates, tetrachloroaluminates, hexafluoroarsenates of lithium.

---

It has been discovered that certain metal salts of the oxyacids of vanadium provide a high voltage electrochemical cell when these are used as depolarizers in organic electrolyte lithium batteries. A specific example is copper vanadate ($Cu_3(VO_4)_2$). The compounds are unstable in the acidic or alkaline electrolytes of conventional batteries, and hence could not be used in batteries prior to my invention. However, these compounds are rendered useful as high energy density depolarizers, according to my invention, by combining them with organic electrolytes and active metal anodes.

The object of this invention is to provide novel high energy density primary cells with attributes similar to those of the $Li/V_2O_5$ cell disclosed in copending application U.S. Ser. No. 829,849 filed May 27, 1969, now abandoned.

The lithium-copper vanadate cells were constructed using the procedures outlined in Example 1 of copending application U.S. Ser. No. 55,170 filed July 15, 1970. The electrolyte used was 1 M $LiClO_4$ in tetrahydrofuran.

The open circuit voltage of this cell was 3.6 volts. On load (4.5 ma. constant current, 1 ma./cm.² C.D. and 20–30 hour rate) the initial voltage was 3.4 volts and the average operating voltage was approximately 2.1 volts. The discharge curve is shown in the figure. The "practical" open circuit voltage is 3.5 volts. The material utilization efficiency up to the 1.5 volt end point was found to be 68%, based on the following cathode reaction:

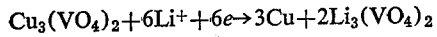

$Cu_3(VO_4)_2 + 6Li^+ + 6e \rightarrow 3Cu + 2Li_3(VO_4)_2$

The theoretical gravimetric energy density was 580 w.-hrs./lb. and the realized gravimetric capacity based on the pure depolarizer, was 360 ma. hr./gm. compared to 432 w.-hrs./lb. and 280 ma. hr./gm. respectively for the $Li/MoO_3$ system disclosed in copending application Ser. No. 853,312 filed August 27, 1969. Thus, the practical energy density of the system was better than that of the $Li/MoO_3$ system.

Also, the shelf life and the non-gassing nature of the system is expected to be just as good as the $Li/V_2O_5$ and $Li/MoO_3$ systems.

The invention is applicable to other metal salts of the oxyacids of vanadium, e.g., Ag, Fe, Co, Ni, Hg, Tl, Pb and Bi vanadates.

The scope of the invention also extends to the areas of anodes, solvents, electrolyte salts, and structures as mentioned in the disclosure of copending application U.S. Ser. No. 55,170 filed July 7, 1970 and other organic electrolyte disclosures.

What is claimed is:

1. A high energy density primary cell comprising a positive electrode composed of the vanadates of silver, copper, iron, cobalt, nickel, mercury, thallium, lead, and bismuth; a negative electrode composed of a light metal, said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxyethane, acetonitrile, dimethyl sulfoxide, dimethyl formamide, and the mixtures thereof, and having dissolved therein soluble salts of the light metals.

2. The cell in claim 1 wherein the electrolyte is composed of a solution of lithium perchlorate in tetrahydrofuran and the negative electrode is composed of lithium.

3. The cell in claim 2 wherein the positive electrode is composed of a mixture of silver vanadate and a conductive diluent.

4. The cell in claim 2 wherein the positive electrode is composed of a mixture of copper vanadate and a conductive diluent.

5. The cell in claim 2 wherein the positive electrode is composed of a mixture of iron vanadate and a conductive diluent.

6. The cell in claim 2 wherein the positive electrode is composed of a mixture of cobalt vanadate and a conductive diluent.

7. The cell in claim 2 wherein the positive electrode is composed of a mixture of nickel vanadate and a conductive diluent.

8. The cell in claim 2 wherein the positive electrode is composed of a mixture of mercury vanadate and a conductive diluent.

9. The cell in claim 2 wherein the positive electrode is composed of a mixture of thallium vanadate and a conductive diluent.

10. The cell in claim 2 wherein the positive electrode is composed of a mixture of lead vanadate and a conductive diluent.

11. The cell in claim 2 wherein the positive electrode is composed of a mixture of bismuth vanadate and a conductive diluent.

12. The cell in claim 1 in which the light metal is selected from the group consisting of Li, Na, K, Ca, Be, Mg, and Al.

13. The cell in claim 1 in which the soluble salt is selected from the group consisting of the perchlorates, hexafluorophosphates, tetrafluoroborates, tetrachloroaluminates, and hexafluoroarsenates of the light metals.

14. The cell in claim 1 in which the soluble salt is selected from the group consisting of the perchlorates, hexafluorophosphates, tetrafluoroborates, tetrachloroaluminates, and hexafluoroarsenates of Li.

15. The cell in claim 1 wherein said positive electrode comprises a mixture of said active materials with an electronically conductive diluent consisting of graphite.

References Cited
UNITED STATES PATENTS

| | | | |
|---|---|---|---|
| 2,081,926 | 6/1937 | Gyuris | 136—83 R |
| 3,468,716 | 9/1969 | Eisenberg | 136—100 |
| 3,508,966 | 4/1970 | Eisenberg | 136—6 |
| 3,547,701 | 12/1970 | Basford et al. | 136—154 |
| 3,562,017 | 2/1971 | Lyall | 136—137 |
| 3,578,500 | 5/1971 | Maricle et al. | 136—6 |

ANTHONY SKAPARS, Primary Examiner

U.S. Cl. X.R.

136—137, 154